(12) United States Patent
Cideciyan et al.

(10) Patent No.: US 9,037,951 B2
(45) Date of Patent: May 19, 2015

(54) DATA MANAGEMENT IN SOLID STATE STORAGE SYSTEMS

(75) Inventors: Roy D. Cideciyan, Rueschlikon (CH); Evangelos S. Eleftheriou, Rueschlikon (CH); Robert Haas, Rueschlikon (CH); Xiao-Yu Hu, Rueschlikon (CH); Ilias Iliadas, Rueschlikon (CH); Thomas Mittelholzer, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 13/516,627

(22) PCT Filed: Dec. 16, 2010

(86) PCT No.: PCT/IB2010/055875
§ 371 (c)(1),
(2), (4) Date: Jun. 15, 2012

(87) PCT Pub. No.: WO2011/073940
PCT Pub. Date: Jun. 23, 2011

(65) Prior Publication Data
US 2012/0260150 A1    Oct. 11, 2012

(30) Foreign Application Priority Data
Dec. 17, 2009 (EP) .................................... 09179741

(51) Int. Cl.
*G06F 11/10* (2006.01)
*G11C 29/00* (2006.01)

(52) U.S. Cl.
CPC ........ *G06F 11/1008* (2013.01); *G06F 11/1012* (2013.01); *G06F 11/1068* (2013.01); *G06F 11/108* (2013.01)

(58) Field of Classification Search
None
See application file for complete search history.

(56) References Cited

U.S. PATENT DOCUMENTS 4,653,051 A  *  3/1987  Sugimura et al. ............. 714/755
5,712,861 A  *  1/1998  Inoue et al. ................... 714/752

(Continued)

FOREIGN PATENT DOCUMENTS

CN    101477481 A    7/2009
GB      2426085 A   11/2006

(Continued)

OTHER PUBLICATIONS

International Search Report dated Apr. 15, 2011 issued in PCT/IB2010/055875.

*Primary Examiner* — Daniel McMahon
(74) *Attorney, Agent, or Firm* — Scully, Scott, Murphy & Presser, P.C.; Jeff Tang, Esq.

(57) ABSTRACT

Methods and apparatus are provided for controlling data management operations including storage of data in solid state storage of a solid state storage system. Input data is stored in successive groups of data write locations in the solid state storage. Each group comprises a set of write locations in each of a plurality of logical subdivisions of the solid state storage. The input data to be stored in each group is encoded in accordance with first and second linear error correction codes. The encoding is performed by constructing from the input data to be stored in each group a logical array of rows and columns of data symbols. The rows and columns are respectively encoded in accordance with the first and second linear error correction codes to produce an encoded array in which all rows correspond to respective first codewords and columns correspond to respective second codewords.

20 Claims, 9 Drawing Sheets

(56) References Cited

U.S. PATENT DOCUMENTS

| | | |
|---|---|---|
| 7,036,068 B2 | 4/2006 | Davis et al. |
| 8,307,258 B2* | 11/2012 | Flynn et al. .................. 714/763 |
| 8,402,201 B2* | 3/2013 | Flynn et al. .................. 711/103 |
| 8,463,983 B2* | 6/2013 | Eleftheriou et al. .......... 711/103 |
| 8,468,292 B2* | 6/2013 | Aszmann et al. ............. 711/103 |
| 2004/0059869 A1* | 3/2004 | Orsley ........................... 711/114 |
| 2008/0282128 A1* | 11/2008 | Lee et al. ...................... 714/755 |
| 2009/0172335 A1 | 7/2009 | Kulkarni et al. |
| 2010/0180182 A1* | 7/2010 | Trantham ...................... 714/799 |
| 2011/0138222 A1* | 6/2011 | Haines et al. ................ 714/6.12 |
| 2012/0266050 A1* | 10/2012 | Cideciyan et al. ............ 714/773 |
| 2013/0205183 A1* | 8/2013 | Fillingim et al. ............. 714/773 |

FOREIGN PATENT DOCUMENTS

| | | |
|---|---|---|
| WO | WO03/027849 A2 | 4/2003 |
| WO | WO2009/107267 A1 | 9/2009 |

\* cited by examiner

|  | 512B<br>NO C2->XOR->RS | 1KB<br>NO C2->XOR->RS | 2KB<br>NO C2->XOR->RS | 4KB<br>NO C2->XOR->RS |
|---|---|---|---|---|
| USER BER<br>= 1e-11 | 378->234->108 | 500->320->200 | 682->440->374 | 984->696->696 |
| USER BER<br>= 1e-15 | 504->306->126 | 640->400->240 | 858->550->462 | 1224->840->840 |
| USER BER<br>= 1e-19 | 630->360->144 | 800->480->280 | 1034->660->528 | 1440->960->960 |

FIG. 11

C1 OVERHEAD IN BITS (ERROR CORRECTION CAPABILITY t FOR 8-ARY BCH C1 CODE)

|  | 512B | 1KB | 2KB | 4KB |
|---|---|---|---|---|
| USER BER<br>= 1e-11 | 216(10) | 384(18) | 870(33) | 1605(61) |
| USER BER<br>= 1e-15 | 240(11) | 420(20) | 975(37) | 1785(68) |
| USER BER<br>= 1e-19 | 252(12) | 468(22) | 1080(41) | 1980(75) |

FIG. 12

DATA MANAGEMENT IN SOLID STATE STORAGE SYSTEMS

CROSS-REFERENCE TO RELATED APPLICATIONS

The present invention relates to and claims the benefit of the filing date of commonly-owned, co-pending PCT Patent Application No. PCT/IB2010/055875, filed Dec. 16, 2010, which further claims the benefit of priority date of commonly-owned, co-pending European Patent Application No. EP 09179741.5, filed on Dec. 17, 2009, the entire contents and disclosure of which is incorporated by reference as if fully set forth herein.

This invention relates generally to data management in solid state storage systems. Methods and apparatus are provided for controlling data storage procedures, in particular the storage of error-correction (EC) encoded data, as well as other data management operations.

Solid-state storage is non-volatile memory which uses electronic circuitry, typically in integrated circuits (ICs), for storing data rather than conventional magnetic or optical media like disks and tapes. Solid state storage devices (SSDs) such as flash memory devices are currently revolutionizing the data storage landscape. These devices are more rugged than conventional storage devices due to the absence of moving parts, and offer exceptional bandwidth, significant savings in power consumption, and random I/O (input/output) performance that is orders of magnitude better than hard disk drives (HDDs).

In SSDs, the storage is organized into storage areas, or "blocks", each of which contains a set of storage locations to which data can be written. (In the following, various operational characteristics of SSDs will be described with particular reference to NAND-based flash memory devices. It will be understood, however, that similar principles apply to other types of SSD). Flash memory, for example, is organized into storage blocks containing data write locations known as "pages". A typical flash page is 4 kB in size, and a typical flash block is made up of 64 flash pages (thus 256 kB). Read and write operations can be performed on a page basis, while erase operations can only be performed on a block basis. Data can only be written to a flash block after it has been successfully erased. It typically takes 15 to 25 µs to read a page from flash cells to a data buffer inside a flash die. Writing a page to flash cells takes about 200 µs, while erasing a flash block normally takes 2 ms or so. Since erasing a block takes much longer than a page read or write, a write scheme known as "write-out-of-place" is used to improve write throughput and latency. With this scheme, a stored data page is not updated in-place in the flash storage. Instead, the updated page is written to another free flash page, and the associated old flash page is marked as invalid by setting a validity flag in the metadata stored as part of each page.

The write-out-of-place scheme, as well as other flash storage characteristics, require certain "housekeeping" operations to be performed for internal management of the flash storage. For example, as pages are updated and old pages invalidated, a follow-up process is required to eliminate invalid data and release storage locations for new input data. This internal management process is commonly known as "garbage collection". The garbage collection process involves selecting an occupied flash block and recovering all still-valid data from that block. The valid data pages are copied to another place in the flash storage, and the block is then erased. Blocks are typically selected for garbage collection based on the number of invalid pages they contain. However, garbage collection and block erasures can also be performed as part of other internal management processes which involve, in effect, moving data within the solid state storage. Wear-leveling is one example of such an internal management process. This process addresses the wear-out characteristics of flash memory. In particular, flash memory has a finite number of write-erase cycles before the storage integrity begins to deteriorate. Wear-leveling procedures aim to distribute write-erase cycles evenly among all available flash blocks to avoid uneven wear, so lengthening overall lifespan. In particular, wear-leveling functionality governs selecting blocks to which new data should be written according to write-erase cycle counts, and also moving stored data within the flash memory to release blocks with low cycle counts and even out wear.

Data placement and internal management operations are typically performed by dedicated control apparatus, known as a flash controller, which accompanies the flash storage. The flash controller manages data in the flash memory generally, controlling all internal management operations, and maintains address metadata in controller memory to track the location of data in the flash storage. In particular, the flash controller runs an intermediate software level called "LBA-PBA (logical block address-physical block address) mapping" (also known as "flash translation layer" (FTL) or "LPN-FPN (logical page number-flash page number) address mapping". This maintains metadata in the form of an address map which maps the logical addresses associated with input datablocks from upper layers, e.g. a file system or host in a storage system, to physical addresses (flash page numbers) on the flash. This software layer hides the erase-before-write intricacy of flash and supports transparent data writes and updates without intervention of erase operations.

The internal management functions performed in SSDs lead to so-called "write amplification". This arises because data is moved internally in the storage, so the total number of data write operations is amplified in comparison with the original number of data write requests received by the SSD. Write amplification is one of the most critical issues limiting the random write performance and write endurance lifespan in solid-state storage devices. Another key issue is error performance. Error correction (EC) coding is performed in SSDs by adding redundancy at the write-unit level. Specifically, an EC code is computed for the input data written to each page, or each sector within a page, and this EC code is recorded in that page, or sector, with the input data. This coding allows recovery from errors within individual data pages. However, further EC coding may be performed on top of this initial coding level. For example, solid state storage systems can employ additional EC coding to protect against failures at the device level. This coding is performed by managing a collection of devices in the manner of a RAID (redundant array of independent devices) array as commonly employed in HDD storage systems. SSD systems employing RAID-like protection are discussed in US Patent Application publication number US 2008/0320214A1, and "SSD Controllers by Start-Up Sandforce", http://www.storagenewsletter.com/news/flash/sandforce-ssd-controllers. In one scenario, a storage system can employ multiple SSDs, each operating as described above with a controller managing its own local storage. The collection of SSDs can then be managed at a higher level like a RAID array. The basic operating principles of such a system will be illustrated below with reference to FIG. 1 of the accompanying drawings.

FIG. 1 is a schematic block diagram of an exemplary RAID-like SSD-based storage system 1. In this system, multiple SSDs 2 operate under storage controller 3 which services read/write requests received from hosts. Each SSD 2 operates as already described to manage data in its internal storage 4. In general, storage 4 may consist of one or more storage channels each having one or more chips or packages of chips, where each chip may contain one or more solid state storage dies. The host LBA (logical block address) space is logically partitioned in storage controller 3 and one segment of each logical block is allocated to a respective SSD 2. Redundancy is added at this stage to allow addition of RAID parity. Specifically, storage controller 3 EC codes each input host datablock (corresponding to a given host ("global") LBA), and the resulting RAID parity is added to the host datablock. The parity-coded block is then partitioned by controller 3 into "unit datablocks". Each unit datablock is supplied under an assigned unit LBA (uLBA) to a respective SSD 2 for storage. The mapping of global LBAs (gLBAs) to uLBAs in the set of SSDs is recorded by controller 3 in a gLBA-uLBA mapping table. Each SSD stores its respective unit datablock and records the physical storage location in a uLBA-PBA mapping table as usual. As a result of this process, RAID codewords are distributed across the array of SSDs 2 as illustrated schematically by the shaded section in the figure. This provides an additional level of EC coding which protects against failures at the SSD level. Within each SSD 2, a local controller performs internal management of storage 4 as described above, but this functionality, and the consequent remapping of uLBAs to PBAs, is transparent to storage controller 3 in this architecture.

FIG. 1 illustrates a so-called "outer RAID" configuration where the RAID codewords span multiple SSDs and hence multiple controllers. An "inner RAID" system can also be employed, in addition or alternatively to outer RAID. Inner RAID is implemented within an SSD controller. In the controller, the LBA space is logically partitioned and one segment of each logical block is assigned to a different sub-unit of the overall storage space. Redundancy is again added to allow addition of inner RAID parity, so that inner RAID codewords are partitioned and distributed among the set of sub-units. Specifically, an inner RAID codeword is partitioned into sub-unit datablocks, and each sub-unit datablock is assigned a sub-unit LBA (suLBA) in the address space of a respective sub-unit. The mapping of LBAs to suLBAs is recorded by the controller in a LBA-suLBA address map. Each sub-unit datablock is then stored in the respective storage sub-unit at a physical storage location which is recorded in a suLBA-PBA mapping table for that unit. This process provides EC coding which protects against failures at the sub-unit level in an SSD. Like outer RAID systems, the controller performs internal management (garbage collection, wear levelling, etc) independently within each storage sub-unit so that this functionality, and the consequent remapping of suLBAs to PBAs, operates at a lower logical level than the RAID coding at the logical block level.

First and second EC coding processes may also be applied within a solid state storage area for improved error recovery, the second EC coding operating on codewords produced by the first EC coding process. NAND flash memory manufacturers are increasingly using multi-level cells (MLC), which store more than one bit per cell, in order to reduce costs per bit and increase storage capacities. MLC is inherently less reliable than single-level memory cells (SLC). As a result of this trend, the endurance of MLC NAND flash has decreased from about 100,000 write/erase cycles to about 10,000 write/erase cycles. Under these circumstances, the error correction capability of the first EC coding of sectors or pages is no longer sufficient because the raw bit error rate associated with MLC NAND degrades faster than the raw bit error rate associated with SLC NAND. Additional coding is therefore required to extend MLC NAND lifetime/endurance and deliver the low user bit error rates of 1 e-11 to 1 e-19 typically required by applications. For example, International Patent Application Publication No. WO 2007/084751A2 describes EC coding and processing systems with one or two EC encoders. Various codes, including linear codes such as RS (Reed-Solomon) and BCH (Bose Chaudhuri Hocquenghem) among many, are mentioned in general, but particulars of the arrangement of codewords in the storage are generally not considered. Mention is made of using RS coding across a stack of memories in an inner RAID-like manner as described above. Another embodiment suggests using TCM (trellis code modulation) encoding on rows of data and RS encoding on columns of data where the resulting rectangular blocks of data are to be written as whole blocks to a memory area. This coding is similar to the RS product codes used in other types of data storage, in particular CD (compact disc), DVD (digital video disc), and tape storage systems. Here input data is organized into logical arrays of rows and columns of data symbols and the rows and columns are encoded in accordance with respective first and second RS codes such that each row of the resulting encoded array is a RS codeword and each column is also a RS codeword. The primary focus of WO 2007/084751A2 is however the interaction between the first code and a modulator/demodulator of the processing system described.

One aspect of the present invention provides a method for storing data in solid state storage of a solid state storage system. The method comprises:

storing input data in successive groups of data write locations in the solid state storage, each group comprising a set of write locations in each of a plurality of logical subdivisions of the solid state storage; and encoding the input data to be stored in each group by constructing from that input data a logical array of rows and columns of data symbols and encoding the rows and columns in accordance with respective first and second linear error correction codes to produce an encoded array in which all rows correspond to respective first codewords and columns correspond to respective second codewords;

the method being such that, in each said group, the encoded input data comprises a plurality of first codewords in each of a plurality of said logical subdivisions and each logical subdivision contains a portion of each of the second codewords for that group.

In embodiments of this invention, therefore, the storage space in a solid state storage system is logically partitioned into a plurality of logical subdivisions, and input data is written to groups of write locations which are distributed across these logical subdivisions. Specifically, each group contains a set of (one or more) write locations in each of a plurality of the logical subdivisions. The input data to be stored in each group is encoded using first and second linear EC codes. A logical array of rows and columns of data symbols is constructed from the input data for the group. The rows and columns of the array are respectively encoded in accordance with the first and second error correction codes to produce a (logical) encoded array in which all rows correspond to respective first codewords and columns correspond to respective second codewords. The resulting codewords are then written across a plurality of the storage subdivisions to give a particular arrangement of the first and second codewords both in individual subdivisions and across the set of subdivisions as a whole. In particular, the encoding and data storage process operates such that, in each group of write locations, a plurality of first codewords are stored in each of a plurality of the storage subdivisions and each subdivision contains a portion of each of the second codewords for that group. This provides for exceptional performance in solid state storage systems, with improved error protection offered by the coding process both within storage subdivisions and across the storage as a whole, as well as protection against failures of individual storage subdivisions in the system. Moreover, the use of linear codes in the coding architecture described allows the coding to be implemented in a particularly simple and efficient manner and provides the basis for still further improvements through use of the "transient" EC codes discussed further below. Embodiments of the invention thus provide efficient, reliable and robust solid state storage systems with exceptional overall performance.

As indicated above, the EC encoding process for input data in a group is performed by constructing from that input data a logical array of rows and columns of data symbols. This array structure is of course only a logical construction for the purposes of the EC coding operation and need not be physically formed as such. The rows of this logical array are encoded in accordance with the first EC code and the columns are encoded in accordance with the second EC code. (In this process, what is considered to be a "row" and a "column" of a logical array is a matter of selection according to deemed array orientation, whereby "rows" and "columns" are effectively interchangeable herein). The order in which the first and second encoding processes are performed (i.e. which of rows and columns are encoded first) may vary in different embodiments. Whichever code is applied last of course operates on the codewords generated by the first-applied code. For example, if row-encoding is performed first then the column-encoding is performed on the encoded rows of input data, i.e. the first codewords. Note that the symbol size need not be the same for the row and column encoding, i.e. the symbols of the first and second codewords may have different numbers of bits. In the resulting encoded array (again a logical construction only), rows and columns correspond to first and second codewords respectively. While all rows correspond to respective first codewords, not all columns necessarily correspond to respective second codewords. This will be discussed further below.

In general, the first and second encoding processes could be implemented by systematic encoding (where the input data to the encoding process is unchanged by the coding but a parity code is added to the unencoded symbols to obtain the output codeword) or by non-systematic encoding (where the input data to the encoding process is embedded by the coding in the output codeword). Preferably, however, systematic encoding is employed. In particular, the second codewords are preferably produced by a systematic encoding process whereby a parity code is added to the set of unencoded symbols for each second codeword. Preferred embodiments of the invention then exploit the linearity of the first and second EC codes to provide not only simple and efficient encoder implementations but also an additional error recovery mechanism. This mechanism uses what are referred to herein as "transient parity codes". Specifically, for each second codeword, at successive stages during storage of the set of unencoded symbols for that codeword, a transient parity code is generated for the symbols stored thus far for that codeword. This transient parity code allows recovery from errors in partially-written groups, e.g. due to a failure part-way through the write process for a group. Moreover, the transient parity code is advantageously copied into the solid state storage in response to interruption of power to the storage system, whereby the transient code is preserved in the event of a power failure. This provides protection against simultaneous power and storage subdivision failure.

The transient parity code is generated at successive stages during storage of the set of unencoded symbols for a second codeword, most preferably on storage of each successive symbol. By exploiting the linear property of the EC codes, the transient parity at each stage can be generated in a simple manner by calculating a "parity vector" for each newly-stored symbol and simply adding this to the transient parity generated for the previously-stored symbol. The transient parity code for the last symbol then comprises the parity code for that codeword. This can be efficiently implemented via a simple feedback register circuit as discussed further below. Moreover, particularly preferred embodiments employ a cyclic code as the second error correction code, exploiting the cyclic property to still further advantage. This will be described in detail below. These embodiments offer exceptionally simple and efficient encoder implementations with transient parity generation.

The data write locations of the solid state storage may be flash pages in a flash memory system. In general, however, the write locations could be any regions of the overall storage to which data can be written in a solid state storage system. Some methods embodying the invention may be applied in a system with a plurality of SSDs, e.g. at the level of the storage controller in FIG. 1, whereby input data is written to groups of write locations which span a plurality of SSDs. Here, for instance, each logical subdivision of the overall system storage could be the storage within a particular SSD. Other embodiments are implemented within a single SSD, the groups of write locations spanning subdivisions of that device's storage. The storage as a whole could in general comprise any desired configuration of storage items, from a single item such as a chip or die to multiple sets of items. However, a typical SSD will have a plurality of storage channels each providing a storage bank, or site, which typically contains multiple packages of one or more storage chips each with one or more solid state dies. The subdivisions into which the available storage is logically partitioned in an SSD could be any subsets of the overall storage area. For example, in an embodiment where the SSD has a plurality of storage channels each having a set of solid state storage units (where each unit may in general comprise a package, chip, die or any other storage area), each logical subdivision could comprise the set of units in a respective channel. (In general, where a set of items is referred to herein, the set may contain one or more items unless the context requires otherwise). Alternatively, for example, each logical subdivision could comprise a respective storage unit.

In the RAID-like systems described earlier, while the EC coding is performed across several sub-units of the overall storage, this coding is performed at the logical block (LBA) level. The internal management (garbage collection, wear levelling, etc) functionality, which involves moving data within the storage area and erasing blocks of write locations, is transparent to the coding system. In particular, internal management is performed independently within each storage sub-unit so that this functionality, and the consequent remapping of suLBAs to PBAs, operates at a lower logical level than the RAID coding. An alternative system is disclosed in our copending European Patent Application filed concurrently herewith under Applicant's reference CH9-2009-0006. That application (the relevant content of which is incorporated herein by reference) discloses a system wherein the EC coding is performed at the physical block (PBA) level and internal management functionality can be performed for the storage area as a whole. Accordingly, a second aspect of the present invention provides a method for managing data in a solid state storage device in which the solid state storage comprises erasable blocks each comprising a plurality of data write locations. The method comprises:

storing input data by a method according to the first aspect of the invention, wherein each said group comprises write locations in a set of erasable blocks in each of said logical subdivisions;

maintaining metadata indicating the location of input data in the solid state storage;

maintaining an indication of validity of data stored in each data write location; and prior to erasing a said block, recovering valid input data from the or each said group containing write locations in that block and re-storing the recovered data as new input data.

In embodiments of this aspect of the invention, the block erasing process is adapted to recover valid data on a group basis. When block erasure is required, for example during garbage collection or other internal management functions, then valid data is recovered from the or each group which contains write locations in a given block prior to erasing that block. The valid input data so recovered can then be re-stored as new input data in new EC-coded groups. Thus, embodiments of this aspect of the invention offer the advantages of the coding and storage system of the first aspect while allowing internal management functions to be performed for the storage as a whole. Unlike the RAID-like systems discussed above which are implemented above the LBA to PBA mapping, the EC coding is performed at the physical block (PBA) level rather than the logical block (LBA) level and the entire storage area can be managed as one entity for internal management purposes. By performing the EC coding at the physical block level in coordination with the essential internal management functionality, these embodiments provide improved error protection in a highly performance-efficient manner. In particular, synergy between the EC coding and internal management processes provides superior error recovery with enhanced overall performance. For example, improved error protection can be achieved without the performance penalties, in terms of increased write amplification and reduced endurance, that would be incurred by performing the EC coding at higher levels. Overall, therefore, these embodiments offer exceptional performance in solid state storage devices.

A third aspect of the invention provides a computer program comprising program code means for causing a computer to perform a method according to the first or second aspects of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

A fourth aspect of the invention provides apparatus for controlling storage of data in solid state storage of a solid state storage system. The apparatus comprises:

control logic for controlling storage of input data in successive groups of data write locations in the solid state storage, each group comprising a set of write locations in each of a plurality of logical subdivisions of the solid state storage;

first and second encoders for encoding the input data to be stored in each group in accordance with respective first and second linear error correction codes;

wherein the control logic is adapted to construct from the input data to be stored in each group a logical array of rows and columns of data symbols, and wherein the first and second encoders are adapted to encode the rows and columns respectively to produce an encoded array in which all rows correspond to respective first codewords and columns correspond to respective second codewords;

the apparatus being adapted such that, in each said group, the encoded input data comprises a plurality of first codewords in each of a plurality of the logical subdivisions for that group and each logical subdivision contains a portion of each of the second codewords for that group.

A fifth aspect of the invention provides a solid state storage device comprising a plurality of solid state storage units and apparatus according to the fourth aspect of the invention for controlling storage of data in the storage units.

In general, where features are described herein with reference to an embodiment of one aspect of the invention, corresponding features may be provided in embodiments of another aspect of the invention.

Preferred embodiments of the invention will now be described, by way of example, with reference to the accompanying drawings in which:

FIGS. 11 and 12 are tables illustrating the improvement in error performance with two different coding schemes in the FIG. 2 device.

Figure 2:
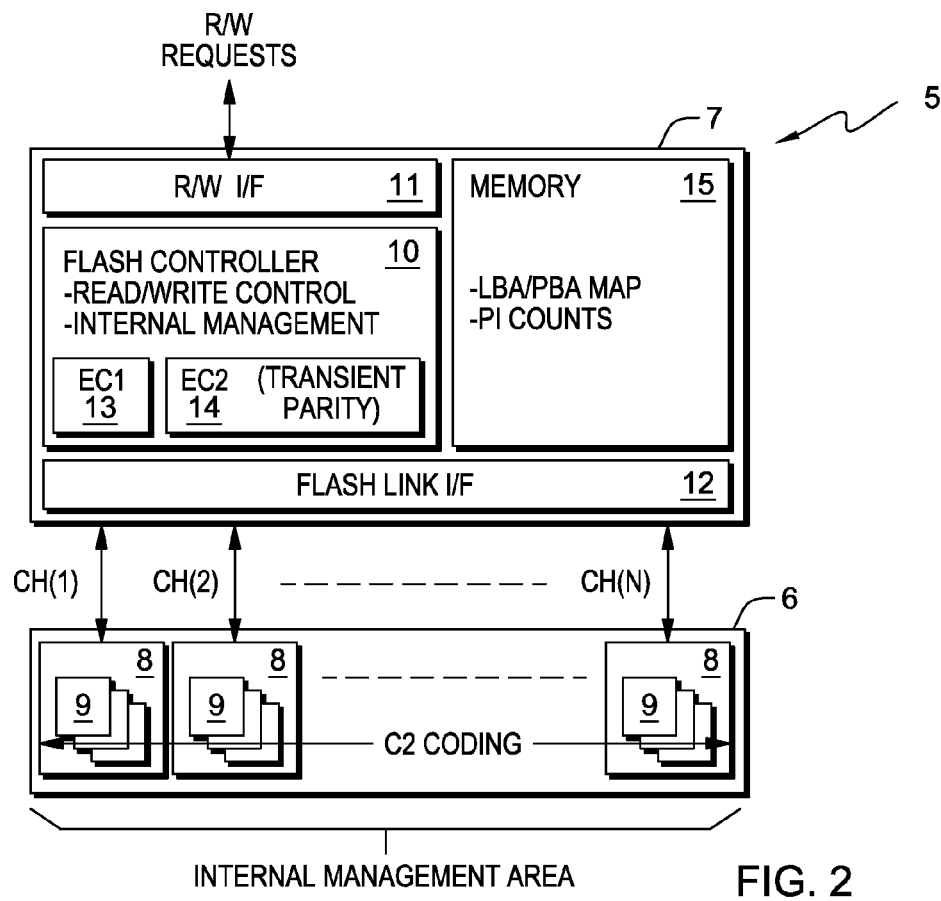
FIG. 2 is a schematic representation of a solid state storage device embodying the invention.

FIG. 2 is a block diagram of an exemplary SSD 5 embodying the invention showing the main elements involved in the data management operations to be described. The SSD 5 has solid state storage 6 and control apparatus indicated generally at 7. In this example, storage 6 consists of N storage channels, Ch(1) to Ch(N), each providing a bank 8 of storage units, here flash storage dies 9. The set of flash dies 9 in each bank 8 can in general be provided on one or more chips or packages of chips, and could comprise SLC (single-level cell) dies, MLC (multi-level cell) dies or a combination thereof. For example, one or more channels may provide MLC storage, the remainder providing SLC storage.

The control apparatus 7 of SSD 5 includes control logic in the form of flash controller 10, a read/write (R/W) interface (I/F) 11 for servicing data read and write requests to the device, and a flash link interface 12 for communication of data with the flash storage channels. Flash controller 10 controls operation of device 5 generally, managing reading and writing of data in response to received requests and handling all internal management functions for flash storage 6. The flash controller 10 also performs EC coding/decoding of data. In particular, the control logic of controller 10 includes a first EC encoder/decoder module EC1, indicated schematically by block 13 in the figure, for performing encoding/decoding in accordance with a first linear EC code referred to hereinafter as a "C1 code". Controller 10 also includes a second EC encoder/decoder module EC2, indicated schematically by block 14 in the figure, for performing encoding/decoding in accordance with a second linear EC code referred to hereinafter as a "C2 code". In this particular example, the EC coding is implemented as a product code with both of the C1 and C2 codes being RS codes. Alternatives will be described below. The second encoder module 14 also performs generation of transient parity codes as described in more detail below. Control apparatus 7 further includes memory 15 for storage of various metadata in operation of flash controller 10 as discussed further below. Memory 15 may comprise, for example, an SDRAM (synchronous dynamic random access memory).

In general, the control logic of flash controller 10, including EC modules 13 and 14, could be implemented in hardware, software or a combination thereof. For example, the control logic could be implemented in whole or in part by software which configures a processor of control apparatus 7 to perform the functions described. Suitable software will be apparent to those skilled in the art from the description herein. In the present example, the EC modules 13 and 14 are implemented by hardwired logic circuits, described below, which perform the encoding/decoding operations under general control of the flash control logic.

Figure 1:
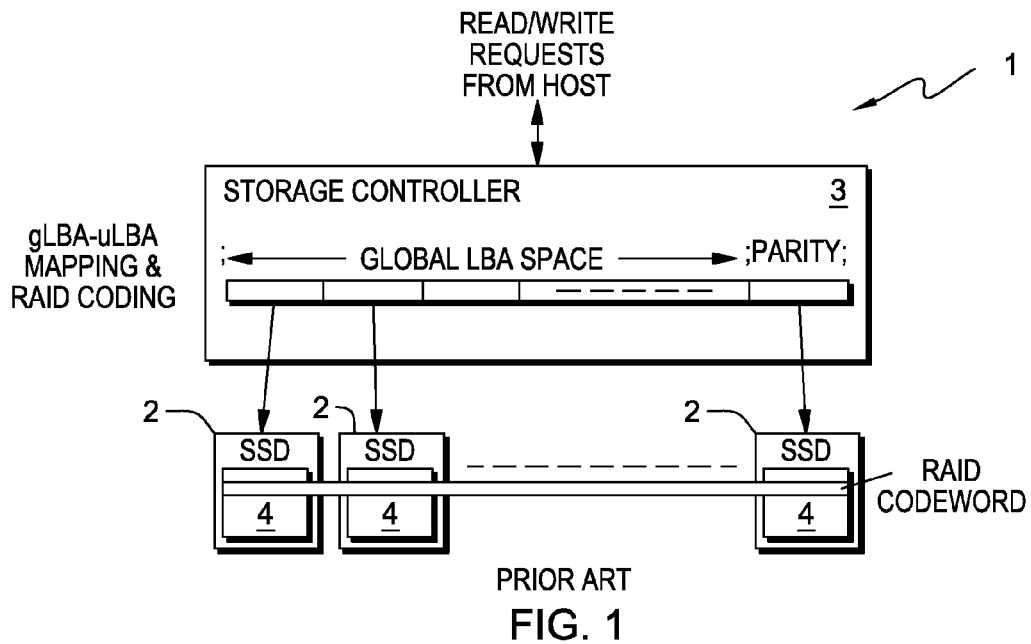
FIG. 1 is a schematic representation of a prior SSD-based storage system with RAID-like coding.

Device 5 could communicate directly with hosts to service read/write requests or could be managed by a higher-level controller which services host requests for a plurality of devices in a storage system. For example, device 5 could form part of a RAID-like array in which multiple SSDs are managed by a storage controller in analogy with the FIG. 1 system. The logical addresses associated with data specified in input read/write requests might therefore refer to the global (host) address space or some logically lower-level address space. These addresses will be referred to simply as LBAs hereinafter.

Data write requests, specifying starting LBA and request size, arrive asynchronously at control apparatus 7 via R/W interface 11. Flash controller 10 controls writing of the input datablocks (corresponding to respective LBAs) to flash storage 6, performing the C1 and C2 coding during the write process. In this example the C1 coding is performed first. (Since a product code is employed in this example, the order of the C1 and C2 coding is immaterial, the same result being achieved in each case, as will be understood by those skilled in the art. The coding order could therefore be reversed if desired). The C1 coding is performed at the write-unit level. That is, as input data is written to individual flash pages in storage 6, C1 coding is performed on this input data by EC1 module 13 to produce one or more C1 codewords for each page. These C1 codewords are then further encoded by EC2 module 14 as discussed further below. Metadata is also stored in each page by flash controller 10. This metadata includes a validity indicator in the form of page-invalid (PI) flag. As part of the normal control operations of flash controller 10, the PI flag for a page can be set by the controller if the data in that page is deemed invalid for some reason, e.g. due to a data update as discussed further below.

For the purposes of writing the encoded data to storage area 6 of SSD 5, the storage 6 is logically partitioned by flash controller 10 into a plurality of logical subdivisions. In this example there are N logical subdivisions corresponding to respective storage banks 8 on the set of N channels. The stream of (encoded) input datablocks is written to a succession of groups of flash pages. In this embodiment, the pages of each group are distributed across all logical subdivisions of storage 6. Specifically, each group of pages, referred to herein as a "stride", contains a set, or "strip", of pages in the storage area 8 of each channel. Each strip typically consists of a predefined number of consecutive pages, i.e. pages with consecutive PBAs, in one or more flash blocks of the channel storage area 8. Each strip has a unique strip id within the storage area 8. For convenience, the strip id can be the PBA of the first page in the strip.

Storage controller 10 records the location of input data in the storage 6 via address metadata which is maintained by controller 10 in memory 15. The address metadata here comprises an LBA/PBA address map indicating the mapping between logical addresses (LBAs) associated with input datablocks and physical addresses (PBAs) in storage 6. Such an address map may in general comprise one or more tables or other data structures from which the physical locations of the strides, and the strips they contain, in which input datablocks are stored can be determined. For example, the address map could specify the mapping of LBAs to stride ids in one table and the mapping of stride ids to strip ids in another table, with a further table indicating the PBA in a strip at which each LBA can be found. In practice, however, a single lookup table containing all address metadata may be preferred for simplicity.

Figure 3:
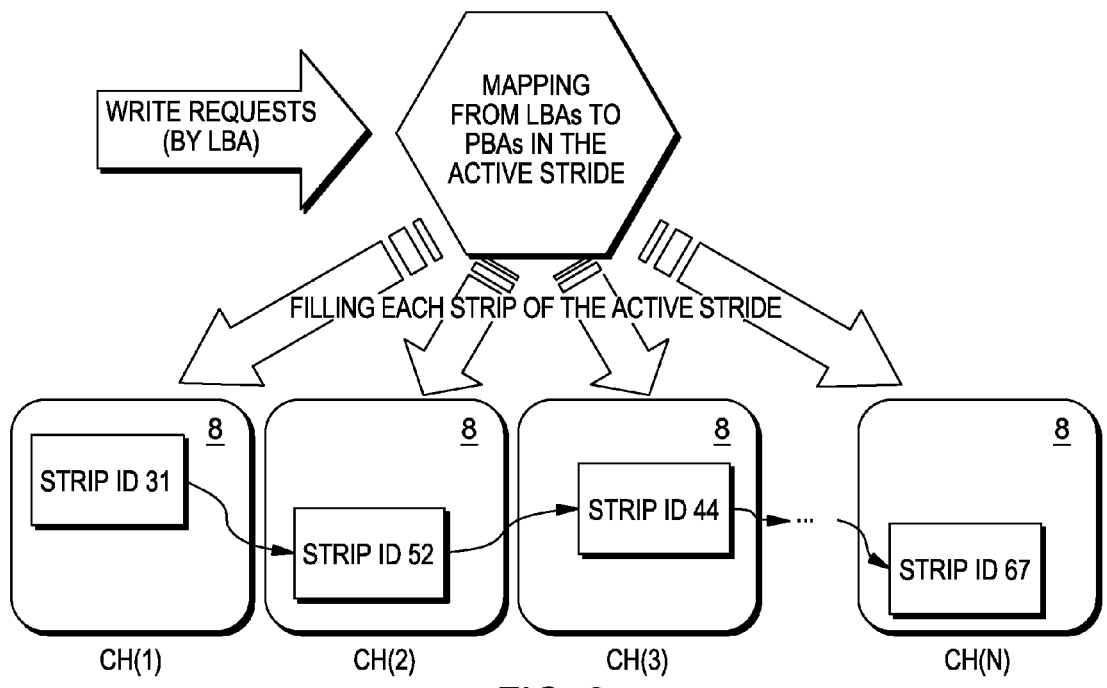
FIG. 3 illustrates writing of input data to a group of write locations distributed across storage subdivisions in the embodiment of FIG. 2.

The encoded input data is stored by writing to each stride in turn. FIG. 3 illustrates this write process for the current active stride. Input data is written to each strip of the stride, with a set of pages in one strip (e.g. the last strip, in Ch(N)) providing redundancy for the C2 encoding process for that stride. That is, the encoding and storage process is performed so as to distribute the input data across the N storage channels of device 5 in C2-coded strides. This will now be explained in detail with reference to FIGS. 4 and 5.

Figure 4:
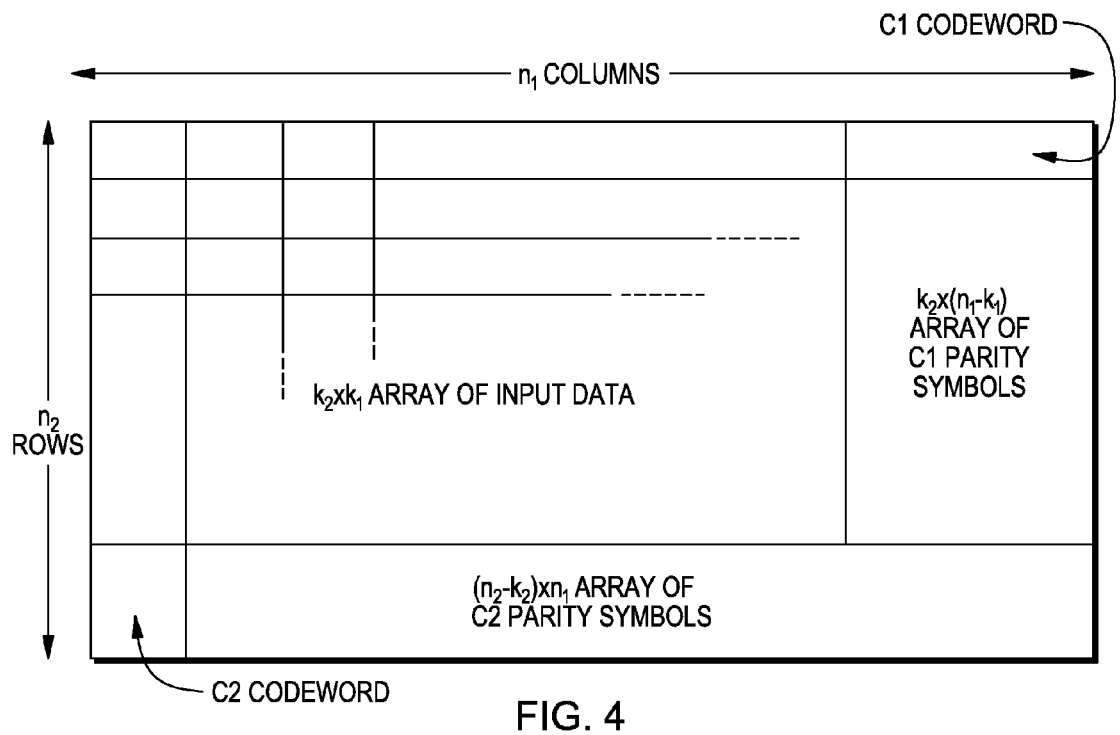
FIG. 4 illustrates EC coding of input data in the SSD of FIG. 2.
Figure 5:
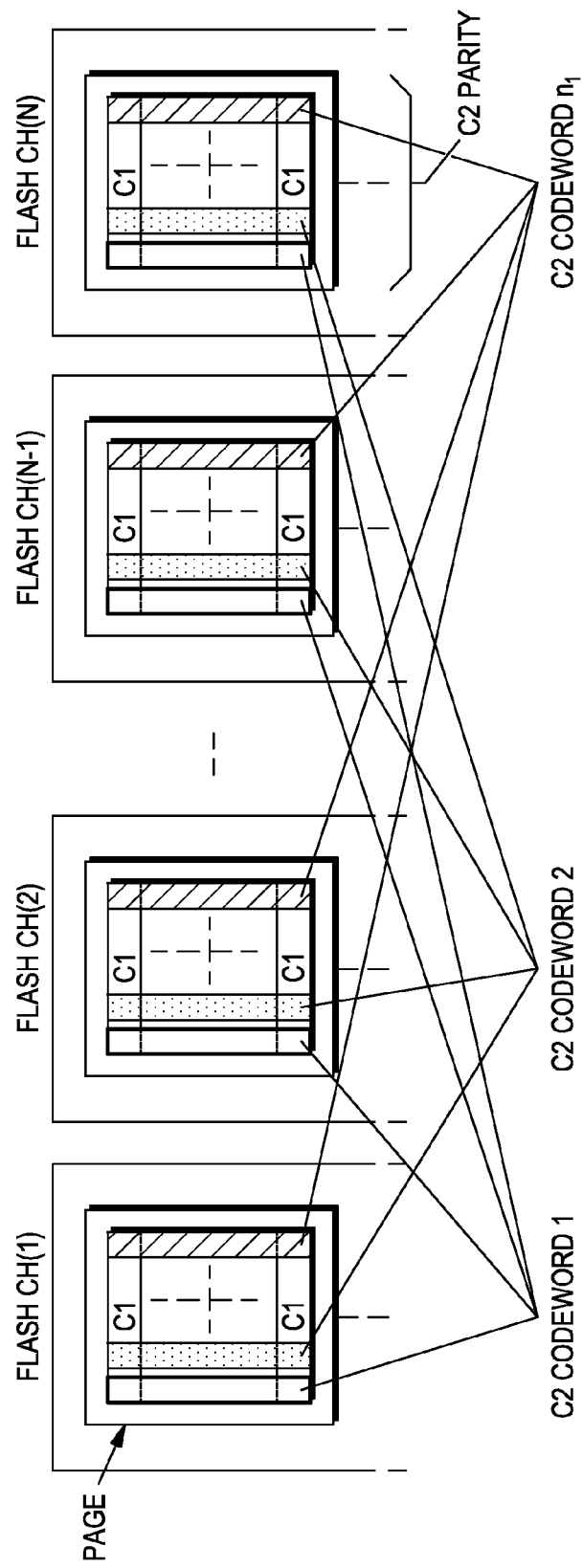
FIG. 5 shows an arrangement of first and second codewords in storage subdivisions of the FIG. 2 device.

FIG. 4 is a schematic illustration of the C1 and C2 encoding processes performed by modules 13 and 14 of flash controller 10 to encode a C1/C2 product code. The input data to be stored in each stride is organized by flash controller 10 so as to construct from this input data a logical array of rows and columns of data symbols. The EC1 and EC2 encoders (13, 14) are adapted to encode the rows and columns respectively of this array. Since the C1 coding is performed first in this example, the C2 coding operates on columns of the resulting, C1-encoded rows. Systematic encoding is used here in both encoder modules 13, 14 whereby each codeword is produced by addition of parity symbols to the unencoded data and the data itself remains unchanged by the encoding process. FIG. 4 illustrates this process in more detail. The input data to be encoded is partitioned by controller 10 into successive logical blocks each comprising a logical array of $k_2$ rows and $k_1$ columns of data symbols as shown in the figure. The EC1 encoder 13 systematically encodes each row in accordance with the C1 code to generate $(n_1-k_1)$ parity symbols for that row. This C1 parity code is added to the $k_1$ input data symbols to produce an $n_1$-symbol C1 codeword. When all $k_2$ rows have been encoded by the EC1 encoder, the resulting set of $k_2$ C1 codewords forms a logical array of $k_2$ by $n_1$ C1-encoded symbols. The C2 encoding performed by EC2 encoder 14 operates on columns of this array. The EC2 encoder 14 systematically encodes each column in accordance with the C2 code to generate $(n_2-k_2)$ parity symbols for that column. This C2 parity code is added to the $k_2$ column symbols to produce an $n_2$-symbol C2 codeword. When all $n_1$ columns have been encoded by the EC2 encoder, the resulting set of $n_1$ C2 codewords forms a logical ($n_2$ by $n_1$)-symbol array as shown in the figure.

The array of encoded symbols shown in the FIG. 4 is written in a single stride as described above with reference to FIG. 3. The process is designed to give a particular configuration of C1 and C1 codewords in individual logical subdivisions (here storage channels 8) and across the set of subdivisions as a whole. This configuration is illustrated by the schematic diagram of FIG. 5. In the example shown, it is assumed for simplicity that a stride contains one page in each of the N channels and each page stores a plurality of C1 codewords. The key features of the codeword arrangement here are that: (1) each storage subdivision spanned by the stride contains a plurality of C1 codewords; and (2) each of these storage subdivisions contains a portion of each of the second codewords in the stride. In the stride shown in FIG. 5, different C2 codewords are indicated by differently-shaded vertical bars. The first channel contains the first portion of each of the $n_1$ C2 codewords. The second channel contains the second portion of each of the C2 codewords, and so on. The last channel, channel N, contains the C2 parity codes for each C2 codeword in this example.

The "orthogonal" arrangement of C1 and C2 codewords which results from the above process gives exceptional error performance in SSD 5. This will be illustrated by examples below. Note however that, while the simple example shown illustrates the general principles of the codeword configuration in a stride, in general the C1 codeword size could be less than, equal to or greater than the page size, and a stride may contain more than one page in each storage subdivision. C2-encoded pages need not, of course, be aligned in the different channels, and the ordering of C2 codeword portions need not follow the channel order. Also, while the C2 parity codes are stored in the $N^{th}$ channel here, any channel could be used for the parity, and even different channels for different strides, as desired.

In general, depending on the system architecture, the strips of a given stride can be filled sequentially or in parallel. In the present embodiment where storage 6 is logically subdivided by channel, strips can be written in parallel to the N channels. In any case, the C2 encoder 14 is designed to exploit the linearity of the C1 and C2 RS codes, providing a simple and efficient implementation and also a further error protection feature. Specifically, as the C1 codewords of a stride are progressively stored in the strips in each storage subdivision, the C2 encoder repeatedly calculates a transient parity code for the symbols stored thus far for each C2 codeword. Preferred encoder designs will now be described with reference to FIGS. 6, 7a and 7b. (Corresponding decoder implementations will be readily apparent to those skilled in the art from the encoder description).

The encoder of a linear error correction code maps k-tuples from the vector space $GF(q)^k$ into codewords in a one-to-one manner, where k is the dimension of the code and $GF(q)^k$ is the set of all k-tuples with elements from the finite field (Galois field) with q elements (q is a power of a prime number) denoted by $GF(q)$. The systematic encoder for a linear block code C can be characterized by the k×n generator matrix G=[I P] where I is the k×k identity matrix and P is a k×(n−k) matrix. The encoding process to generate a codeword c (row vector), which has n components, can be described by multiplying an input data row vector a, which has k components, with the generator matrix G, i.e., c=a G. The encoding process is a linear one-to-one mapping of a k-dimensional vector space to the k-dimensional subspace defined by the code C.

A systematic encoder for the linear C2 code can be characterized by the generator matrix G=[I P] where I is the $k_2$×$k_2$ identity matrix and P is a $k_2$×($n_2$−$k_2$) matrix. The $i^{th}$ row of the matrix P is denoted by $p_i$ where $1 \le i \le k_2$. Furthermore, the data vector a is a $k_2$-tuple (row vector) with elements denoted by $a_i$ where $1 \le i \le k_2$. The symbol-by-symbol transient parity code $t_i$ generated by this encoder is defined by the recursive equation $t_i = t_{i-1} + a_i p_i$ where $t_0 = 0$ and $1 \le i \le k_2$. The C2 codeword generated as a result of the systematic encoding process of the data vector a is then the row vector [a p] where the parity row vector p is the transient parity vector $t_i$ at the end of the encoding process, i.e., at the time $i=k_2$. In the following, it is assumed that the number of C1 codewords in a page is given by an integer M that divides $k_2$. In other words, each C2 codeword has M elements from GF(q) in a page. The transient parity code generated after processing the first page is then $t_M$ and the transient parity code generated after processing the second page is $t_{2M}$, etc. Finally, the codeword that is generated after processing the last $(k_2/M)^{th}$ page is [a p] where as stated above the parity row vector p is the transient parity code $t_i$ at the end of the encoding process.

Figure 6:
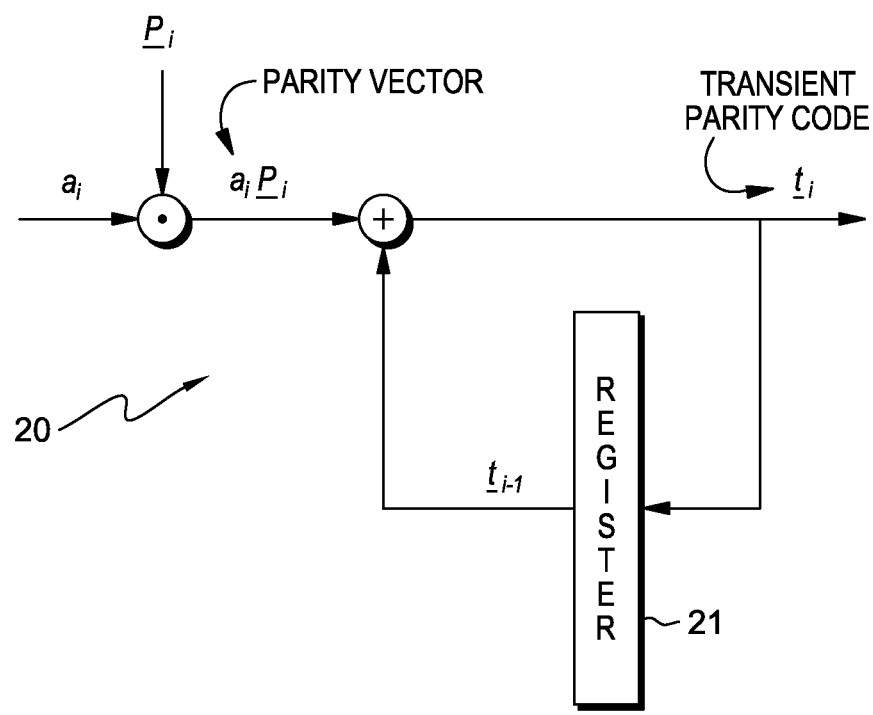
FIG. 6 shows one embodiment of a transient parity generation circuit in a second encoder of the FIG. 2 device.

FIG. 6 illustrates how the transient parity codes for the C2 codewords can be generated in C2 encoder 14. For each C2 codeword, the encoder includes a simple feedback register circuit 20 as shown in the figure. As each successive symbol $a_i$ (from the set of unencoded symbols for that C2 codeword) is supplied for storage, the circuit 20 generates a parity vector $a_i p_i$ for that symbol. The parity vector $a_i p_i$ is then added to the transient parity code $t_{i-1}$ generated for the preceding symbol which is output by register 21. (Note here that the transient parity code $t_i$ for the first symbol is simply the parity vector $a_i p_i$ for that symbol). The result of this vector addition is the current transient parity code $t_i$ for the symbols stored thus far for the C2 codeword. The transient parity code $t_i$ is then stored in register 21. When the last symbol $a_i$ is stored at time $i=k_2$ the transient parity code output by circuit 20 is the parity code p for the codeword.

It will be seen from the foregoing that the transient parity code $t_i$ is generated on storage of successive symbols $a_i$ in a particularly simple manner, using a register 21 that stores $t_i$ with ($n_2$−$k_2$) symbols from GF(q) and a simple feedback circuit. The $C_2$ parity can be stored on ($n_2$−$k_2$)/M pages or chips. If ($n_2$−$k_2$)/M=1 only one "extra" chip is needed for storing $C_2$ parity and this scheme can recover missing data due to single chip failures. If ($n_2$−$k_2$)/M=2, two extra chips are needed for storing $C_2$ parity and this scheme can recover missing data due two chips failing during the recovery process. Moreover, the transient parity stored in register 21 can be used by flash controller 10 when required to recover from errors in partially completed strides. In addition, if the flash controller detects an interruption in the power supply to control apparatus 7, the controller copies the current transient parity code (together with the other metadata, including the current address map, in memory 15) into an available region of flash storage 6 before shut-down. The transient parity can thus be preserved in the event of a power failure, providing protection against simultaneous power failure and storage unit/channel errors.

Note that, while the foregoing description has focussed on C2 encoder 14 for explanation of the transient parity mechanism, the C1 encoder 13 can be similarly implemented by a simple feedback register circuit in accordance with the principles described above.

In particularly preferred embodiments, the C2 code used in C2 encoder 14 is a cyclic code and the encoder design exploits the properties of such codes for an especially simple and efficient implementation. For cyclic codes it is convenient to introduce the polynomial notation. In the following, a codeword $c=(c_0, c_1, \ldots, c_{n-1})$ is represented by the codeword polynomial $$c(x) = \sum_{j=0}^{n-1} c_j x^j.$$

Similarly, all row vectors such as data vectors will also be represented by polynomials. A cyclic code is characterized by the unique monic generator polynomial $$g(x) = \sum_{j=0}^{n-k} g_j x^j$$

where all coefficients of the generator polynomial are from GF(q) and the leading coefficient of the generator polynomial is one, i.e., $g_{n-k}=1$. All codewords of a cyclic code are multiples of the generator polynomial g(x). In other words, every codeword in a cyclic code can be represented as the product of the generator polynomial and a polynomial of degree (k−1) or less.

A systematic encoder for a cyclic code can be obtained as follows. We assume the data polynomial at the input of the systematic encoder is $$a(x) = \sum_{j=0}^{k-1} a_j x^j.$$

The corresponding codeword for a cyclic code, which is characterized by the generator polynomial g(x), is then given by $c(x)=x^{n-k}a(x)+p(x)$ where the parity polynomial p(x) of degree (n−k−1) or less is selected such that c(x) is divisible by g(x).

Figure 7A:
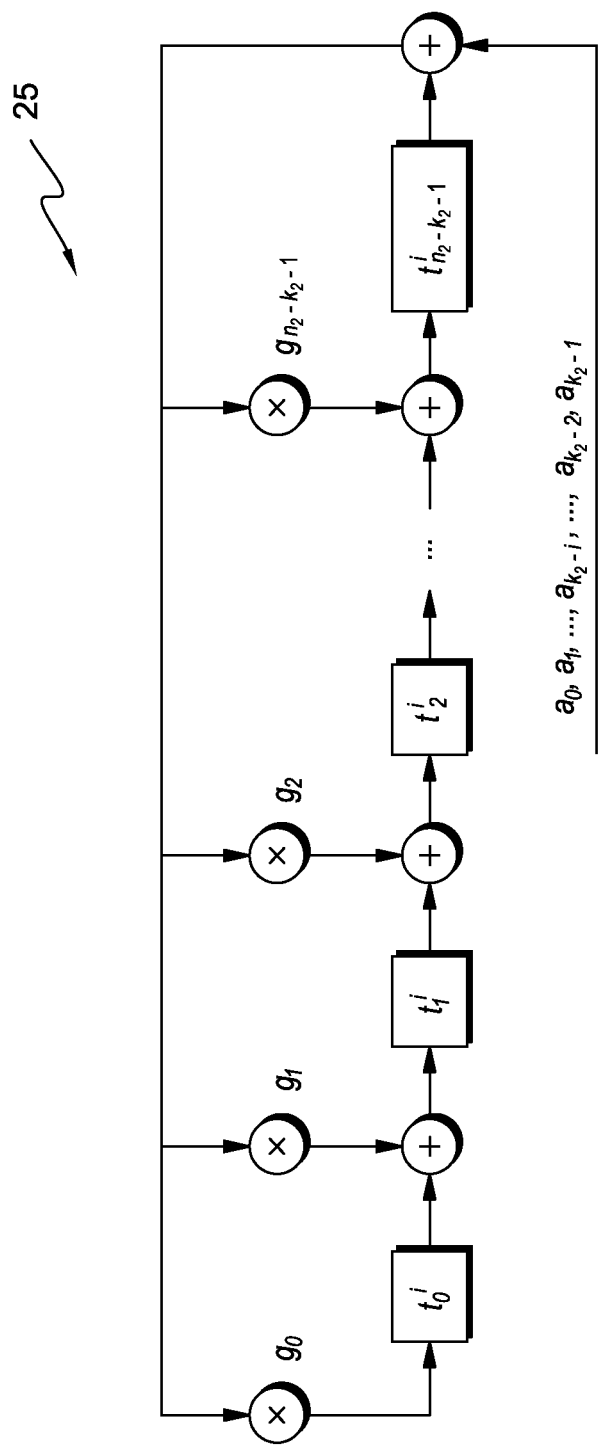
FIGS. 7a and 7b show two different representations of another embodiment of a transient parity generation circuit for a second encoder of the FIG. 2 device.

FIG. 7a illustrates how the transient parity codes for a cyclic C2 code with generator polynomial g(x) can be generated in C2 encoder 14. For each C2 codeword c(x), the encoder includes a linear feedback shift register circuit (LFSR) 25 as shown in the figure. As each successive symbol from the set of unencoded symbols for the C2 codeword is supplied for storage, the circuit 25 generates a transient parity code represented by polynomial $$t^i(x) = \sum_{j=0}^{n_2-k_2-1} t^i_j x^j.$$

The feedback coefficients of the shift register circuit are given by the coefficients $g_j$, all $0 \le j \le n_2-k_2-1$, of the generator polynomial. The content of the shift register is the coefficients of the transient parity polynomial $t^i_j$ at time i. In the beginning, the registers are initialized to zero, i.e., $t^0_j=0$ for all $0 \le j \le n_2-k_2-1$. The C2 codeword that is generated as a result of the systematic encoding process of the data polynomial a(x) is then the codeword polynomial $c(x)=x^{n_2-k_2}a(x)+p(x)$ where the parity polynomial p(x) is the transient parity polynomial t(x) at the end of the encoding process, i.e., at the time $i=k_2$. The transient parity polynomial $t^i(x)$ is computed after shifting i symbols $a_{k_2-1}, a_{k_2-2}, \ldots, a_{k_2-i}$ into the feedback shift register circuit. In the following, it is assumed that the number of C1 codewords in a page is given by an integer M that divides $k_2$. In other words, each C2 codeword has M elements from GF(q) in a page. The transient parity polynomial $t^i(x)$ generated after processing the first page is then $t^M(x)$ and the transient parity polynomial generated after processing the second page is $t^{2M}(x)$, etc. Finally, the codeword that is generated after processing the last ($k_2/M$)-th page is $x^{n_2-k_2}a(x)+p(x)$ where the parity polynomial p(x) is the parity code for the C2 codeword and corresponds to the transient parity polynomial $t^i(x)$ at the end of the encoding process as stated above. As before, the transient parity code from register circuit 25 can be copied to flash storage 6 in the event of a power failure.

Figure 7B:
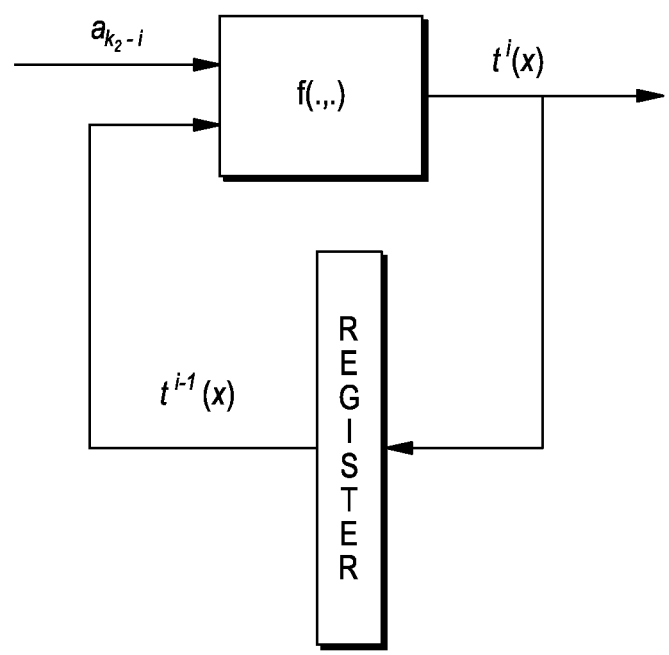

The LFSR circuit 25 of FIG. 7a is a finite-state machine where the state at time i is defined by the transient parity polynomial $t^i(x)$ and the input symbol is $a_{k_2-i}$. Therefore, the LFSR circuit can be described by the state-update equation $t^i(x)=f(a_{k_2-i}, t^{i-1}(x))$, $1 \le i \le k_2$, as illustrated in FIG. 7b. The initial condition is given by $t^0(x)=0$.

In operation of SSD 5, error checking is typically performed after each data-write, as well as on read-out of data in response to a read request or during internal management operations discussed below. A C1 codeword is declared as "erased" (erroneous) whenever the C1 decoder of EC1 module 13 is not able to decode the C1 codeword. These C1 erasures can then be corrected by the C2 decoder of EC2 module 14. If the C2 parity in a stride is located on one channel only, the error correction capability of the C2 RS decoder is the number of C1 codewords per page divided by two whereas the erasure correction capability of the C2 RS decoder is the number of C1 codewords per page. C1 codewords may also contain a CRC (cyclic redundancy check code) which can be used to declare the C1 codeword as erased at the output of the C1 decoder if the CRC does not check. Whenever a strip contains page or block errors that cannot be corrected by the C1 error correction process, the following procedure is performed by flash controller 10. A new strip is selected from the same storage area 8 as the strip containing the error. This strip will replace the "bad strip" in the stride in question. The other strips in the stride are identified from the address metadata in memory 15, and the content of these strips is read. The content of the bad strip is read, and the content of the other strips in the stride is used to reconstruct erroneous data in the bad strip via the C2 decoding algorithm. The reconstructed (error-corrected) data is then written to the replacement strip and the address metadata is updated to reflect the modified stride structure. The page-invalid (PI) flag is then set in each page of the old, bad strip to indicate that the content of these pages is invalid. These pages will be recycled during a subsequent garbage collection process described below.

Figure 8:
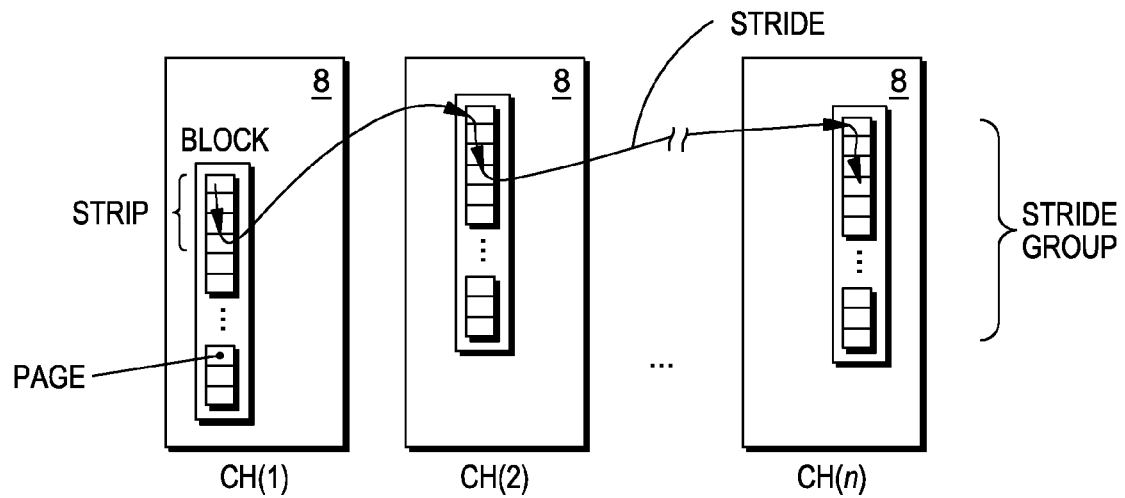
FIG. 8 shows one example of the configuration of write locations in a group of write locations across storage subdivisions in FIG. 2.
Figure 9:
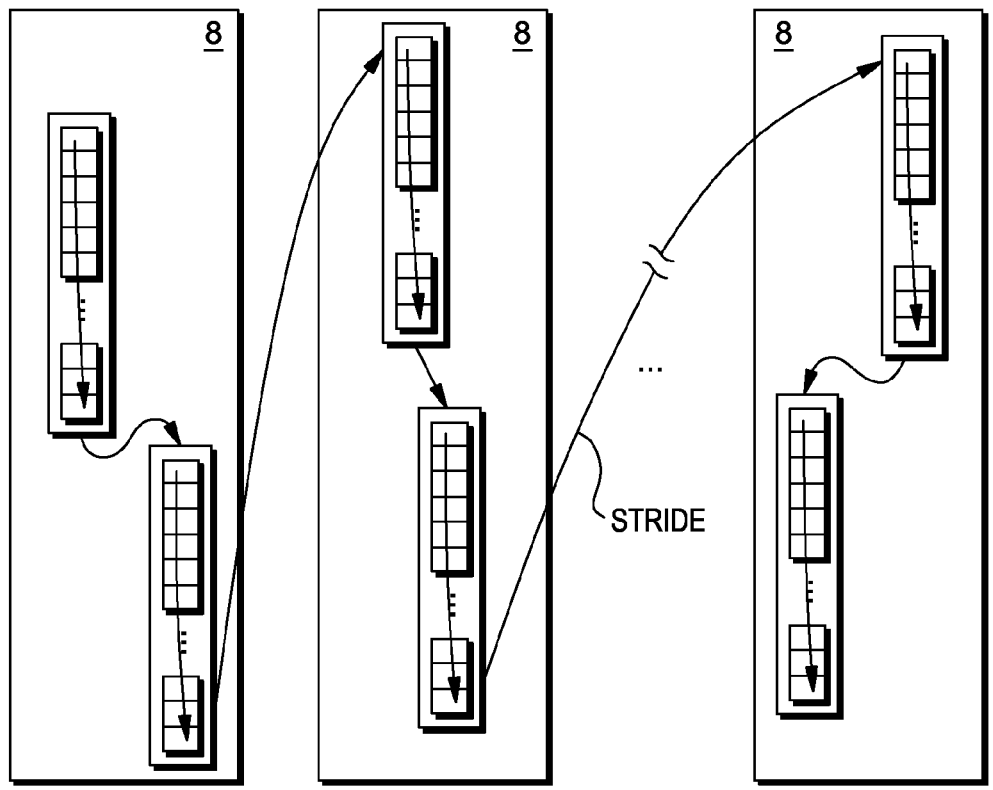
FIG. 9 shows another example of the configuration of write locations in a group.

The allocation of strips to particular strides, and the order of stride selection in a write operation, can be implemented in various ways in controller 10 and suitable implementations will be apparent to those skilled in the art. These features are not central to the present invention and need not be discussed in detail here. In general, however, each strip contains pages in one or more flash blocks in a given channel. FIGS. 8 and 9 show two examples of possible stride configurations. In FIG. 8, the C2 strip size is four pages. A single stride is indicated by the arrows in the figure. Assuming a flash block size of 64 pages, then each block will contain strips of 16 different strides. These 16 strides share the same blocks in all channels. Such a set of strides which share a common set of blocks is referred to hereinafter as a stride group. Note that blocks of the same stride group in different channel storage areas 8 need not be physically aligned. FIG. 9 shows an alternative example where the C2 strip size is two blocks. Each stride thus consists of two blocks in each storage channel, and a stride group here consists of a single stride. Note that blocks of the same stride in each channel storage area 8 need not be physically consecutive.

As data is updated in flash storage 6 using the write-out-of-place scheme explained earlier, flash controller 10 sets the page-invalid (PI) flag for any page which has been updated by an LBA overwrite. The PI flag is similarly set for pages containing data deleted by a host. Storage controller 10 also maintains a count for each stride group indicative of the number of invalid pages in the whole of that stride group. These PI counts for stride groups are recorded as part of the metadata maintained in memory 15. The PI counts are used during internal management operations performed by controller 10 as described further below.

Although storage 6 is logically subdivided for the C2 coding described above, internal management functions are performed for the storage as a whole. That is, flash controller 10 treats all subdivisions (the N storage channels) as a single storage entity for internal management purposes. To this end, internal management functions which involve erasing blocks, such as garbage collection and wear-levelling, are adapted to account for the cross-subdivision C2 coding. In particular, the recovery of valid data during such processes is performed on a stride group basis rather than a block basis. Before a block is erased, valid input data is recovered from the or each stride in the stride group containing write locations in that block. This operation is described in more detail below with reference to FIG. 10 for the garbage collection process.

Figure 10:
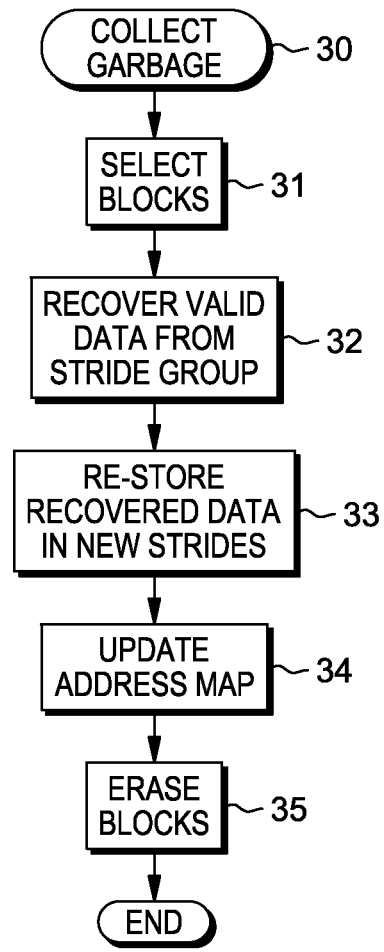
FIG. 10 illustrates an internal management process performed in the SSD of FIG. 2.

The block diagram of FIG. 10 shows key steps in the garbage collection process performed in SSD 5. When garbage collection is initiated (represented by step 30 in the figure), flash controller 10 first selects the blocks which are to be erased. This selection, performed at step 31, is based on the PI counts stored in memory 15 for stride groups. In particular, the blocks in stride groups with the highest PI counts can be selected for recycling first. Having selected a stride group, in step 32 flash controller 10 recovers all still-valid data from the pages of that stride group. Thus, data is read from all pages in the stride group for which the respective PI flags are not set. Error correction processing based on the C1 and C2 codes described above can be performed as required in this process. The valid data so recovered is then fed back as input data to be re-stored in flash storage 6. Thus, recovered data is re-stored in new strides as indicated at step 33. In step 34, flash controller 10 updates the address map in memory 15 to reflect the new data locations. The blocks of the old, recycled stride group can then be erased by flash controller 10 in step 35. Block erasures may be performed immediately or at any subsequent time by controller 10 to release these blocks for storage of new data.

It will therefore be seen that all strips of a stride group are recycled together during garbage collection. The same principle can be applied in any internal management process, such as wear-levelling for example, involving moving data within the flash prior to block erasures. As part of the normal monitoring functionality of controller 10, blocks which show endurance problems (too many C1 errors) can be identified and flagged as "bad blocks" during the recycling process. This flagging can be based on a block error count maintained by flash controller 10 as part of the metadata stored in memory 15. Blocks which are tagged as bad in this way are not used by controller 10 for subsequent data placement.

It will be understood from the foregoing that, unlike prior RAID-like systems, the C2 coding is performed at the physical block level in SSD 5 with the entire storage area being managed as one entity for internal management purposes. The C2 coding operation is transparent to the LBA/PBA mapping, and offers protection against complete failures taking place at the page, block, chip, bank and channel levels. The use of transient parity codes as described above also provides resistance against simultaneous power and unit failure. By performing the C2 coding in a synergistic fashion with internal management functionality as described above, SSD 5 achieves improved error rates with exceptional overall performance. For example, error performance is enhanced without the write amplification and endurance penalties of higher-level coding. By way of illustration, the SSD 5 can be compared to a RAID-like SSD-based system of the type described earlier by assuming that one channel is used for redundancy in each case. In SSD 5, assuming channel N is entirely allocated to C2 codes, we define $w_1$ as the write amplification due to internal management (garbage collection and wear-levelling). If we assume for simplicity that each strip contains one page only, then each page write leads to $(1+1/(N-1))w_1$ page writes as the controller computes a parity page for (N-1) pages, one from each channel. In contrast, with the RAID-like system, if $w_2$ denotes the write amplification due to garbage collection and wear-levelling, then each page write leads to $2w_2$ page writes, one data page and one RAID parity page. Moreover, $w_1 < w_2$ because the internal management is performed "globally", treating all storage channels as a unified storage area.

The features detailed above lead to exceptional performance in solid state storage systems. By way of example, the table of FIG. 11 compares results using the RS-based C2 code scheme described above with results using no C2 code and a simple XOR-based C2 code. The table summarizes the results for a raw NAND bit error rate of 1 e-3 using a Gilbert burst error channel with an average burst length of 5 bits. The columns show the required C1 overhead in bits, for each of the three coding systems ("no C2", XOR, and "RS"), for the different C1 dataword sizes of 512 bytes (512 B), 1 KB, 2 KB and 4 KB. (Note that the C1 codeword size in bits is the sum of the C1 dataword size in bits and the C1 parity size in bits. Furthermore, 1 KB stands for 1024 B, 2 KB stands for 2048 B and 4 KB stands for 4096 B). Each row gives the results for a different user bit error rate (BER). (8+1 parity) channels (pages) are assumed. The page size is assumed to be 4096 bytes. It can clearly be seen that the RS-based C2 code significantly reduces the required C1 RS overhead. In fact, all cases are now within the region of sufficient overhead that requires an overhead less than or equal to [218, 436, 872, 1744] bits for the cases [512 B, 1 KB, 2 KB, 4 KB]. Here a 4 KB+218 B MLC flash memory is assumed, i.e. a page contains (4096+218) bytes. With the new 40 nm NAND flash technology, an 8 KB page size is already available. For an 8 KB page size, the gains with the RS-based C2 code will be even more significant due to the longer RS-based C2 codewords for the same C2 code rate.

Note that other linear codes such as BCH codes can also be used for the C1 and/or C2 code provided that the coding architecture gives the required arrangement of C1 and C2 codewords over storage subdivisions as described above. As an example, the table of FIG. 12 gives the C1 overhead in bits for 3-bit MLC flash and an 8-ary BCH code as a C1 code. The overheads in bits here is an upper bound because the BCH bound is used. The C2 code is an RS code, and (8+1 parity) channels (pages) are assumed as in the table of FIG. 11. The raw NAND bit error rate is again 1 e-3. Independent 8-ary symbol errors are assumed to occur in the channel, and the page size is assumed to be 4096 bytes as before.

It will be seen from the above that embodiments of the invention provide a significant reduction in page EC overhead (C1 overhead). For fixed C1 overhead this is equivalent to a significant improvement in integrity of stored data. Moreover, the transient parity codes are computed in a manner that is efficient in terms of computational and memory resources and offer an additional error recovery mechanism.

Efficiency may be improved even further by appropriate selection of C2 stride and strip sizes, and the relationship of strip size to LBA size, in a given case. Such considerations are similar to those encountered in RAID applications as will be apparent to those skilled in the art. In some embodiments of the invention, the flash controller may be adapted to adjust the C2 strip and stride size dynamically in operation. For instance, the flash controller could switch between different strip/stride sizes in dependence on predetermined criteria, for example depending on the size of a write request. Stride length might also be reduced as the blocks become more and more unreliable, e.g. due to wear and aging. Appropriate modifications to the embodiment described will be apparent to those skilled in the art.

Since a product code is employed in the above example, the symbol size is the same for the C1 and C2 coding. Hence, each small rectangle in FIG. 4 represents a symbol of both a C1 and a C2 codeword. Also, in the resulting encoded array, all rows correspond to respective C1 codewords and all columns correspond to respective C2 codewords. The use of a product code is not essential, however. In general any linear codes can be employed for the C1 and C2 codes of the concatenated coding scheme, and the symbol size for these C1 and C2 codes (and hence the row and column encoding) need not be the same. For such more general concatenated codes, the C2 coding is generally performed first. Hence, referring to FIG. 4 (and assuming equal C1 and C2 symbol size for simplicity), columns of the $k_2$ by $k_1$ input data array are first encoded to produce $k_1$ C2 codewords. Rows of the resulting array are then encoded to produce $n_2$ C1 codewords. In this case, all rows of the resulting encoded array are C1 codewords. However, the last few (here $n_1$-$k_1$) columns of the encoded array containing the C1 parity symbols need not be C2 codewords. In the equivalent FIG. 5 arrangement for this case, therefore, the last few (here $n_1$-$k_1$) vertical bars in each channel need not be portions of C2 codewords but may simply contain the C1 parity symbols.

It will be appreciated that numerous further changes and modifications can be made to the above embodiments. By way of example, while the logical subdivisions of storage 6 for C2 coding are aligned with the storage channels in SSD 5, in general these subdivisions could be any subset of the available storage. For instance, the subdivisions could alternatively consist of respective flash dies 9 in FIG. 2. The coding architecture described could also be applied across a set of SSDs in a storage system, each storage subdivision corresponding to the storage in a particular SSD. Also, individual C2 codewords need not necessarily span all subdivisions. In device 5, for example, the C2 strides could alternatively span a plurality of channels less than the total number N, the collection of strides as a whole being distributed across all channels. In this case, when a new strip is selected to replace a bad strip in the C2 error-correction process, the new strip can be selected from the same storage channel or any other channel which does not already contain a strip of the same stride. Stride length might also be reduced so that strides span fewer channels when blocks become unreliable as mentioned above.

In embodiments described above, a stride contains a plurality of pages in the or each block in each storage subdivision, the pages within each block being consecutive (i.e. having consecutive physical addresses). In general, however, the set of pages for a stride in any one subdivision may contain more or less than the number of pages in a block. For ease of implementation, the number of pages in each subdivision is preferably an integral factor or integral multiple of the number of pages in a block. Where the number of pages for a group in each subdivision is less than the block size, more than one group can share the same block. In this case, internal management operations are significantly simplified if any groups which share a common block in one logical subdivision also share a common block in each logical subdivision.

In some embodiments, the system may switch from a mode in which only C1 decoding is performed to a mode in which decoding of C2 codewords is additionally performed. For example, early in the storage lifetime only C1 decoding might be routinely performed unless device failure requires C2 decoding. As the raw error rate increases with increased wear, however, C2 decoding could be routinely performed to improve data reliability and device endurance.

While a NAND flash device has been particularly described, the invention can of course be applied to other types of solid state storage system. In addition, the particular C1 code employed can be selected in dependence on the type of flash used and the particular error mechanisms in a given system. In general, the C1 code can be any linear code e.g. a binary BCH code or a q-ary BCH code as well as an RS code. Similarly, while a RS C2 code is preferred, the C2 code can in general be any linear, and preferably also cyclic, code.

Many other changes and modifications can be made to the exemplary embodiments described without departing from the scope of the invention.

The invention claimed is:

1. A method for storing data in solid state storage of a solid state storage system, the method comprising:
   storing input data in successive groups of data write locations in the solid state storage, each group comprising a set of write locations in each of a plurality of logical subdivisions of the solid state storage; and
   encoding the input data to be stored in each group by constructing from the input data a logical array of rows and columns of data symbols by first encoding each row of data symbols in accordance with a first linear error correction code to produce an encoded array having corresponding rows of first codewords, and then encoding each column of said encoded array having corresponding rows of first codewords in accordance with a second linear error correction code to produce in said encoded array corresponding columns of second codewords in which all rows of said encoded array correspond to said first codewords and columns of said encoded array correspond to said second codewords;
   wherein, in each said group, the encoded input data to be stored comprises a plurality of said first codewords in each of said plurality of logical subdivisions and each logical subdivision of said plurality contains a portion of each of the second codewords for the group, wherein for each successive group, the stored second codeword includes a set of unencoded symbols, the encoding the input data further comprising:
   for each second codeword, at successive stages during a storage of said set of unencoded symbols for that second codeword in the group, implementing a feedback register circuit to generate a transient parity code for the unencoded symbols stored thus far for that second codeword by:
  generating a parity vector for a first stored symbol; and
  for each successive said symbol after said first stored symbol, generating the transient parity code by adding the parity vector generated for said successive symbol to the transient parity code generated for a preceding symbol, where the transient parity code generated for the first symbol is the parity vector for that symbol, and
  the transient parity code generated on storage of a last symbol of said set of unencoded symbols comprises the parity code for the second codeword.

2. The method as claimed in claim 1 wherein the second error correction code is a cyclic code.

3. The method as claimed in claim 1 including:
  producing the second codewords by a systematic encoding process whereby a parity code is added to the set of unencoded symbols for each second codeword.

4. The method as claimed in claim 3 including storing said transient parity code in the solid state storage system in response to interruption of power to the solid state storage system.

5. The method as claimed in claim 1 wherein each of the first and second linear error correction codes is a Reed-Solomon code.

6. A method as claimed in claim 1 for storing data in a solid state storage device having a plurality of storage channels each having a set of solid state storage units, wherein each of said plurality of logical subdivisions comprises the set of solid state units in a respective channel.

7. The method as claimed in claim 1 for storing data in a solid state storage device having a plurality of solid state storage units, wherein each of said plurality of logical subdivisions comprises a respective solid state storage unit.

8. The method as claimed in claim 1, further comprising:
  managing data in solid state storage of a solid state storage device in which the solid state storage comprises erasable blocks each comprising a plurality of data write locations, the method further comprising:
  storing input data in groups in the solid state storage, wherein each said group comprises the plurality of write locations in a set of said erasable blocks in each of said logical subdivisions of the solid state storage;
  maintaining metadata indicating a location of said input data in the solid state storage;
  maintaining an indication of validity of data stored in each data write location; and
  prior to erasing an erasable block, recovering valid input data from each said group containing write locations in the erasable block and re-storing the recovered valid input data as new input data.

9. A computer program product embodying a non-transitory computer readable storage medium, the medium not a propagating signal, the computer readable storage medium storing a program of instructions executable by a machine for causing the machine to perform a method for storing data in solid state storage of a solid state storage system, the method comprising:
  storing input data in successive groups of data write locations in the solid state storage, each group comprising a set of write locations in each of a plurality of logical subdivisions of the solid state storage; and
  encoding the input data to be stored in each group by constructing from the input data a logical array of rows and columns of data symbols by first encoding each row of data symbols in accordance with a first linear error correction code to produce an encoded array having corresponding rows of first codewords, and then encoding each column of said encoded array having corresponding rows of first codewords in accordance with a second linear error correction code to produce in said encoded array corresponding columns of second codewords in which all rows of said encoded array correspond to said first codewords and columns of said encoded array correspond to said second codewords;
  wherein in each said group, the encoded input data to be stored comprises a plurality of said first codewords in each of said plurality of logical subdivisions and each logical subdivision of said plurality contains a portion of each of the second codewords, wherein, in each successive group, the stored second codeword includes a set of unencoded symbols, the encoding the input data further comprising:
  for each second codeword, at successive stages during a storage of said set of unencoded symbols for that second codeword in the group, generating a transient parity code for the unencoded symbols stored thus far for that second codeword by:
    generating a parity vector for a first stored symbol; and
    for each successive said symbol after said first stored symbol, generating the transient parity code by adding the parity vector generated for said successive symbol to the transient parity code generated for a preceding symbol, where the transient parity code generated for the first symbol is the parity vector for that symbol, wherein
  the transient parity code generated on storage of a last symbol of said set of unencoded symbols comprises the parity code for the second codeword.

10. An apparatus for controlling storage of data in solid state storage of a solid state storage system, the apparatus comprising:
  a control device implementing control logic for controlling storage of input data in successive groups of data write locations in the solid state storage, each group comprising a set of write locations in each of a plurality of logical subdivisions of the solid state storage; and
  a first and second encoder, each for encoding the input data to be stored in each group;
  wherein the control logic is adapted to construct from the input data to be stored in each group a logical array of rows and columns of data symbols, and wherein the first encoder is adapted to first encode each row of data symbols in accordance with a first linear error correction code to produce an encoded array having corresponding rows of first codewords, and then said second encoder is adapted to encode each column of said encoded array having corresponding rows of first codewords in accordance with a second linear error correction code to produce in said encoded array corresponding columns of second codewords, wherein
  all rows of said encoded array correspond to said first codewords and columns of said encoded array correspond to said second codewords;
  the apparatus being adapted such that, in each said group, the encoded input data to be stored comprises a plurality of said first codewords in each of a plurality of the logical subdivisions for the group and each logical subdivision of said plurality contains a portion of each of the second codewords for the group, wherein in each successive group, the stored second codeword includes a set of unencoded symbols, and for each second codeword, at successive stages during a storage of said set of unencoded symbols for that second codeword in the group, the second encoder generating a transient parity code for the unencoded symbols stored thus far for that second codeword, said second encoder comprising:

for each second codeword, a feedback register circuit for receiving successive symbols of said set of unencoded symbols for the second codeword on storage, the feedback register circuit is adapted to:
  generate a parity vector for a first stored symbol; and
  for each successive said symbol after said first stored symbol, generate the transient parity code by adding the parity vector generated for said successive symbol to the transient parity code generated for a preceding symbol, where the transient parity code generated for the first symbol is the parity vector for that symbol, wherein
  the transient parity code generated on storage of a last symbol of said set of unencoded symbols comprises the parity code for the second codeword.

11. The apparatus as claimed in claim 10 wherein the second encoder is a systematic encoder for adding the parity code to the set of unencoded symbols for each second codeword.

12. The apparatus as claimed in claim 10 wherein:
the second linear error correction code is a cyclic code.

13. The apparatus as claimed in claim 11 wherein the control logic is adapted to control storage of said generated transient parity code in the solid state storage in response to interruption of power to the apparatus.

14. The apparatus as claimed in claim 10 for controlling storage of data in a solid state storage device having a plurality of solid state storage units, wherein each of said logical subdivisions comprises a respective set of said solid state storage units.

15. A solid state storage device comprising a plurality of solid state storage units and apparatus as claimed in claim 14 for controlling storage of data in the solid state storage units.

16. The method of claim 1, wherein each logical subdivision includes a stride having a predefined number of consecutive pages, the encoded input data is stored by writing to each stride in turn, the method comprising:
  storing the transient parity in a register; and
  using, by a controller device, the stored transient parity to recover from errors in a partially completed stride.

17. The computer program product of claim 9, wherein each logical subdivision includes a stride having a predefined number of consecutive pages, the encoded input data is stored by writing to each stride in turn, the method comprising:
  storing the transient parity in a register; and
  using, by a controller device, the stored transient parity to recover from errors in a partially completed stride.

18. The apparatus of claim 10, wherein each logical subdivision includes a stride having a predefined number of consecutive pages, the encoded input data is stored by writing to each stride in turn, the feedback register circuit comprising a register for storing the transient parity code, wherein the control device uses the stored transient parity code to recover from errors in a partially completed stride.

19. The method of claim 16, wherein upon storing each successive symbol $a_i$ from the set of unencoded symbols for that second C2 codeword, said feedback register circuit is configured for:
  generating a parity vector $a_i\, p_i$ for that symbol, adding the parity vector $a_i\, p_i$ to a transient parity code $t_{i-1}$ generated for a preceding symbol which is output by the register to result in a current transient parity code $t_i$ for the symbols stored thus far for the second codeword, and
  storing the current transient parity code $t_i$ in said register.

20. The apparatus of claim 18, wherein upon storing each successive symbol $a_i$ from the set of unencoded symbols for that second C2 codeword, said feedback register circuit configured to:
  generate a parity vector $a_i\, p_i$ for that symbol,
  add the parity vector $a_i\, p_i$ to a transient parity code $t_{i-1}$ generated for a preceding symbol which is output by the register to result in a current transient parity code $t_i$ for the symbols stored thus far for the second codeword, and
  store the current transient parity code $t_i$ in said register.

* * * * *